(12) United States Patent
Panabaker et al.

(10) Patent No.: US 7,925,807 B2
(45) Date of Patent: Apr. 12, 2011

(54) DYNAMIC MICROCODE FOR NON-VOLATILE MEMORY

(75) Inventors: Ruston Panabaker, Redmond, WA (US); John Mark Miller, Kirkland, WA (US); James R. Hamilton, Bellevue, WA (US); Avi R. Geiger, Seattle, WA (US); Robert Patrick Fitzgerald, Fall City, WA (US); James Charles Kleewein, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 12/127,626

(22) Filed: May 27, 2008

(65) Prior Publication Data

US 2009/0300238 A1 Dec. 3, 2009

(51) Int. Cl.
*G06F 13/12* (2006.01)
*G11C 7/06* (2006.01)
(52) U.S. Cl. ..................... 710/62; 365/189.07
(58) Field of Classification Search ............... 710/62; 365/189.07
See application file for complete search history.

(56) References Cited

U.S. PATENT DOCUMENTS

| | | | |
|---|---|---|---|
| 5,367,639 A * | 11/1994 | Sodos | 710/24 |
| 5,606,660 A * | 2/1997 | Estakhri et al. | 714/38 |
| 6,021,475 A * | 2/2000 | Nguyen et al. | 711/156 |
| 6,161,208 A * | 12/2000 | Dutton et al. | 714/764 |
| 6,351,800 B1 * | 2/2002 | Martin et al. | 712/36 |
| 6,775,423 B2 | 8/2004 | Kulkarni et al. | |
| 7,035,965 B2 | 4/2006 | Zitlaw | |
| 7,155,560 B2 | 12/2006 | McGrew et al. | |
| 7,210,010 B2 | 4/2007 | Ogle | |
| 7,278,002 B2 | 10/2007 | Winters et al. | |
| 2004/0194081 A1 | 9/2004 | Qumei et al. | |
| 2004/0215755 A1 * | 10/2004 | O'Neill | 709/223 |
| 2006/0053275 A1 * | 3/2006 | Morris et al. | 713/1 |
| 2006/0075284 A1 | 4/2006 | Skan | |
| 2006/0149894 A1 | 7/2006 | Hong | |
| 2007/0156976 A1 | 7/2007 | Mathews et al. | |
| 2008/0109798 A1 * | 5/2008 | Gavens et al. | 717/168 |
| 2008/0114924 A1 * | 5/2008 | Frayer et al. | 711/103 |
| 2008/0205117 A1 * | 8/2008 | Takashima | 365/145 |
| 2008/0225607 A1 * | 9/2008 | Achter | 365/189.07 |

OTHER PUBLICATIONS

Configuring SingleStep and Downloading Boot Code http://www.physiol.ox.ac.uk/Computing/Online_Documentation/Matlab/toolbox/mpc555dk/ppc_d14a.html. Last accessed Oct. 25, 2007, 7 pages.

(Continued)

*Primary Examiner* — Henry W Tsai
*Assistant Examiner* — Hyun Nam
(74) *Attorney, Agent, or Firm* — Lee & Hayes, PLLC

(57) ABSTRACT

Providing for arbitration and dynamic downloading of microcode at a controller associated with electrically erasable non-volatile memory is described herein. By way of example, a download agent can be provided to a module of such non-volatile memory. Characteristics of the memory module and/or specifications of a host application can be utilized to select one or more memory control modules from a group of such control modules. A selected control module(s) can be installed at the controller via the download agent to provide non-default management of raw memory. Further, arbitration of multiple control modules can be implemented to select among various mechanisms to control/manage raw memory. Arbitration can be based, for instance, on specifications of a host device application. Accordingly, great flexibility and control of raw non-volatile memory can be provided for a host device at an application level.

20 Claims, 10 Drawing Sheets

OTHER PUBLICATIONS

Downloading to Flash http://www.keil.com/support/man/docs/ulink2/ulink2_su_downloading.htm. Last accessed Oct. 25, 2007, 1 page.

Valery Sklyarov, et al. A Prototyping System for Mobile Devices. IWCMC'07, Aug. 12-16, 2007, Honolulu, Hawaii, USA. ACM 978-1-59593-695-0/07/0008 http://delivery.acm.org/10.1145/1290000/1281048/p505-sklyarov.pdf?key1 =1281048&key2=7371923911&coll=potal&dI=ACM&CFID=15151515&CFTOKEN=6184618. Last accessed Oct. 25, 2007, 6 pages.

Computing Applications—Intel NOR Flash Memory: Better By Design http://www.developers.net/intelisdshowcase/view/2576. Last accessed Oct. 25, 2007, 2 pages.

* cited by examiner

DYNAMIC MICROCODE FOR NON-VOLATILE MEMORY

BACKGROUND

The advent of non-volatile electronic memory has provided remarkable benefits for storage of electronic information. Non-volatile memory can retain stored data even when not powered. Thus, non-volatile memory provides for ready transportation of data as continuous connection to a power source, such as a battery, is not necessary. Furthermore, electrical power can be preserved by utilizing non-volatile memory by simply shutting off power to a device when processing requirements or other system requirements are not required.

Some examples of non-volatile memory can include mechanically addressed non-volatile memory, such as hard disks, optical discs, magnetic tape, holographic memory, etc., and electrically addressed non-volatile memory, such as Flash memory (e.g., NOR gate flash, NAND gate flash, electrically erasable read only memory [EAROM], electrically programmable read only memory [EPROM], electrically erasable programmable read only memory [EEPROM]). Some electrically addressed memory can comprise raw memory that is controlled by a device processor (e.g., a central processing unit of a personal computer). In such instances, the device processor requires access to instructions for properly programming and/or erasing the raw memory. In other instances, electrically addressed memory is coupled with a microcontroller. The microcontroller can perform read, write and erase operations, as well as data management, such as cell interleaving, memory block maintenance and cell error management. Typically, the microcontroller is provided with a default set of instructions when manufactured to perform the above operations.

Memory coupled with a microcontroller can provide an advantage for a host system as opposed to non-controlled, raw flash. For instance, operations associated with data storage are offloaded to the microcontroller alleviating execution demands at a host processor. Accordingly, in such an arrangement, the host processor simply provides data to be stored or requests data to be retrieved and receives the data. Addressing, maintenance, erasing, wear-leveling, and like operations can be avoided by the host processor, enabling the host processor to reserve processing resources for host applications instead.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject disclosure provides for a dynamic download agent installed in conjunction with a controller of electrically erasable non-volatile memory (hereinafter referred to as non-volatile memory). The dynamic download agent can obtain and/or arbitrate between microcode, configuration files, and/or firmware, or the like, that provides a non-default mechanism to interact with the non-volatile memory. The microcode/firmware can be installed in a memory module and accessed by the microcontroller. Further, the microcontroller can interface with a host processor of a host computer and implement the microcode/firmware based on a request from the host processor.

According to further aspects, non-volatile memory having an onboard controller can be adapted to receive microcode/firmware comprising at least one non-default algorithm. The microcode/firmware can employ the non-default algorithm to manage raw memory (e.g., cells, blocks of cells, and/or all cells of a memory module) in a manner that is different from manufacturer-shipped specifications. In addition, the onboard controller can interface to an external processor that executes applications that consume data. The onboard controller can utilize factory-shipped microcode/firmware, or the microcode/firmware comprising the non-default algorithm(s), based in part on execution of the applications.

In some aspects of the subject disclosure, non-volatile memory can store multiple sets of microcode/firmware each comprising at least one non-default algorithm. An onboard controller of the non-volatile memory can allocate portions of raw memory cells to each set of microcode/firmware. An arbitration algorithm can select between the sets of microcode/firmware based on a desired non-default algorithm for controlling and/or managing raw memory. Furthermore, the arbitration algorithm can select between the sets of microcode/firmware based on specifications provided by a host computer. Accordingly, algorithms for controlling and/or managing raw flash can be changed (e.g., real-time) based on requirements of an application running on a host device.

According to further aspects, disclosed is a system comprising a host device coupled with a non-volatile memory module. The host device comprises a host processor that queries an onboard controller associated with the non-volatile memory module. A result of the query can comprise at least one characteristic of the non-volatile memory and/or controller. The at least one characteristic can be utilized to cross-reference a predetermined schema and determine compatibility of the memory module/controller with non-default microcode/firmware. Such non-default microcode/firmware can include instructions for interacting with raw memory cells. A download agent can be provided to the memory module, and one or more non-default microcode/firmware modules can be downloaded to the memory module via the download agent. Accordingly, the system can provide non-default control of raw memory cells coupled with the host device.

According to still other aspects, a system is provided that can determine compatibility of a non-volatile memory module and/or controller with a set of microcode/firmware. Further, a plurality of microcode/firmware modules, each having at least one non-default algorithm for interacting with raw memory cells, can be downloaded to the memory module. A host device can select from available microcode/firmware to change a manner in which the raw memory cells are accessed, managed, erased, error-proofed, and so on. In some aspects, the host device can select a microcode/firmware based on requirements or specifications of an application executing at the host device. Accordingly, the subject disclosure provides for changing management and/or control of raw memory based at least in part on specifications of an application executing on a host device.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the

DETAILED DESCRIPTION

Figure 1:
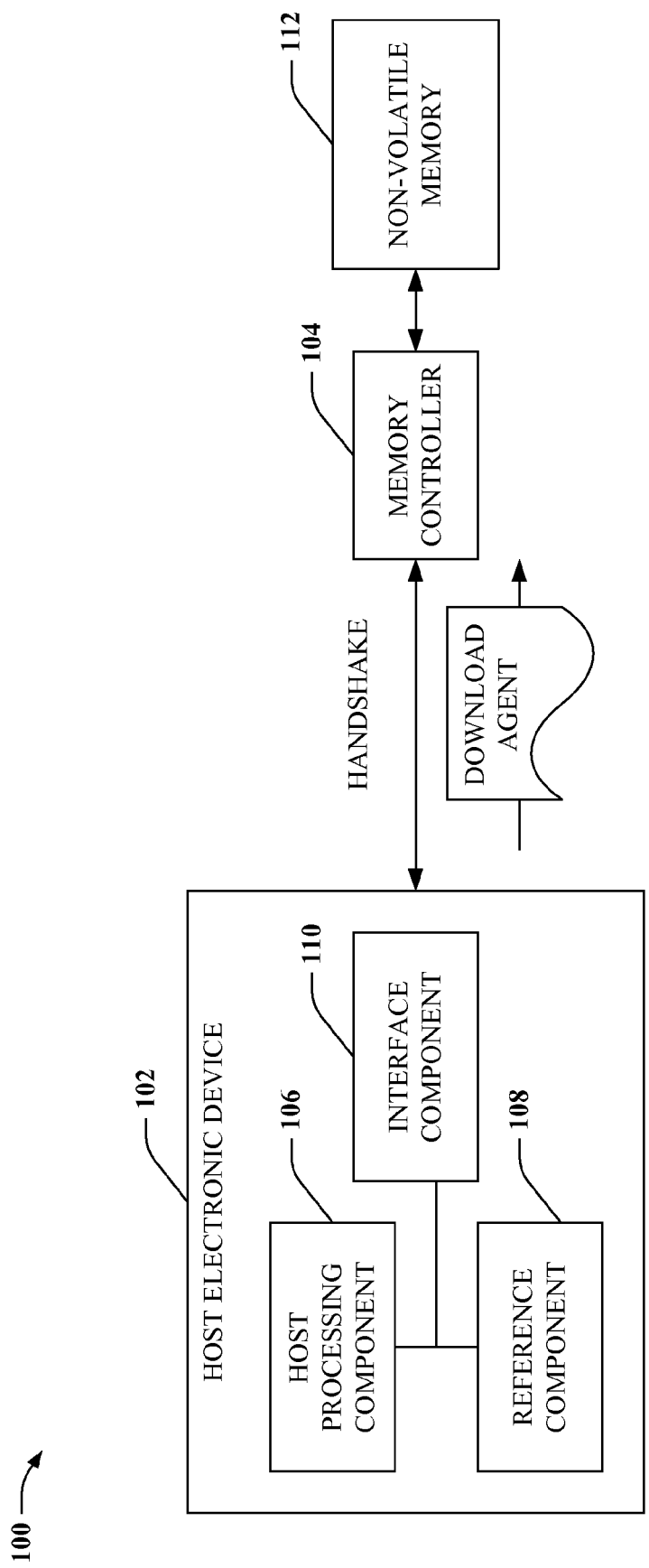
FIG. 1 illustrates a block diagram of a sample system that provides non-default microcode for a non-volatile memory controller in an aspect disclosed herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", "engine", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component can be localized on one computer and/or distributed between two or more computers. As another example, an interface can include I/O components as well as associated processor, application, and/or API components, and can be as simple as a command line or a more complex Integrated Development Environment (IDE).

Electrically addressable non-volatile memory (hereinafter referred to as non-volatile memory), such as Flash memory and the like, typically comprises at least raw memory cells and an addressing structure for reading, writing and erasing data (e.g., a bit or multi-bit digital word in the form of levels of charge stored in a cell). Some non-volatile memory further comprises a microcontroller, a process module, a processor, etc., bundled into a package with the raw memory and addressing structure. The memory processor can include firmware or microcode that defines a manner in which the processor operates and interacts with the raw memory. Thus, the electronic features and limitations of controlling the memory are determined in large part by the microcode (as well as hardware limitations of the memory processor and the addressing structure of the memory).

In certain circumstances, a memory module's microcode can be upgraded. For instance, a memory manufacturer can provide updated microcode to correct problems with device operation. The updated microcode is generally termed a firmware update. Updating firmware provides a mechanism to fine tune operation of electronic hardware, such as a memory module. However, firmware updates have various limitations.

One limitation of updating firmware for a memory module is that prior microcode utilized by the memory module must be erased in order to install and implement the updated microcode. This is not a significant limitation with respect to fixing program errors, or bugs, because the new microcode/firmware can implement the desired instructions of the prior microcode while correcting undesired instructions. Even with the ability to update microcode, modern non-volatile memory still has no mechanism for implementing non-default instructions based on characteristic of a memory module or characteristics of a software application storing and/or retrieving data from the memory module.

The subject disclosure provides for selecting among process modules for non-volatile memory (e.g., firmware modules, microcode modules, configuration files etc.), based at least in part on a characteristic of a non-volatile memory module. For instance, addressing characteristics such as write speed, erase speed, re-write speed, and so on, can be referenced in determining a process module for the memory. Other characteristics such as wear-leveling or data interleaving can also be used in determining an appropriate process module. In some aspects, transient characteristics of a particular module can be also be utilized. Transient characteristics can include a number of erase cycles experienced by one or more blocks of the memory module (e.g., providing an indication of memory cell wear), a position within the memory module of blocks having a number of erase cycles, number and/or position of 'bad' or error block(s), an amount of data stored in raw memory, or a type of a subset of the data stored in memory, and so on. Accordingly, microcode can be selected for a memory module depending on particular characteristics of one memory module and/or of a class of memory modules.

Also provided is a system that can query memory to determine characteristics of the memory module. Based on the characteristics, a process module can be selected for the memory module. The system can provide a download agent to the memory module to facilitate downloading one or more selected process modules to the memory module. Prior code stored at the memory module can be erased or partitioned in storage from additional process modules. Where a memory module stores more than a single process module at a time, arbitration can be employed to interface a memory controller with a selected process module. For instance, a data flag can be set that indicates a particular process module as usable by the memory controller. In some aspects, additional data flags associated with inactive process modules can be set to indicate that such modules are not usable by the memory controller.

By changing a process module for non-volatile memory, raw memory operations can be changed as well. Thus, a host device for instance can provide a process module suitable for establishing a selected write-time, if the hardware capabilities of the memory module can support the selected write-time. As another example, a process module implementing a non-intrusive wear-leveling algorithm, minimizing intrusion on other memory operations, can be provided to the memory module. If an application running on a host device involves sensitive reading/writing/erasing of data, the non-intrusive wear-leveling algorithm can be provided to the memory module in advance of executing the application.

According to still other aspects, non-default operations can comprise improved memory rollback operations. Microcode instructions can be utilized by a memory processor to generate an index at the memory module that identifies blocks of cells and a status for such cells. The index can identify, for instance, a block of cells that stores data, a block of cells that is erased, a block of cells that is scheduled to be erased, or an intermediary block of cells utilized to refresh data of another block of cells.

To illustrate the foregoing, typically when a block of non-volatile memory, such as Flash memory, is refreshed, stored data must be copied to temporary memory. A block to be refreshed is identified. Data within the block is copied to a temporary block. The block to be refreshed is scheduled to be erased, and is erased at a suitable time (e.g., when the block is next in queue to be erased). Data stored in the temporary memory is then re-written to the refreshed block once erasure is complete, or the data can be forwarded to a substitute block. If the latter, a block address of the substitute block can be updated/associated with the refreshed block, or the location of the data in the index can be changed, as suitable, to facilitate locating the forwarded data. Typically, instructions for erasing, refreshing, reading, writing, etc., flash memory blocks are set to default instructions contained in firmware. However, according to the subject disclosure, default instructions can be updated based on characteristics of the raw memory or requirements of a host application.

As a specific example, a custom process module can contain instructions that provide non-default data rollback. For instance, if a memory block is refreshed such that data is copied from the memory block to a temporary block, as described above, an index can be updated to reflect the position of the temporary block. To rollback the data, it can simply be read from the temporary block instead of waiting for the refresh of the memory block. As another example, erase time of the memory block can be delayed for a period of time. Rollback can then be conducted simply by updating the addressing index and removing the memory block from an erase schedule. Because the memory block was not actually erased, data stored in the memory block can still be read there from. Thus, the data can be 'rolled back' simply by updating the addressing index to re-associate the data with the memory block.

It should be appreciated that various advantages are provided by the subject disclosure. First, by providing a dynamic download agent to a memory module, a host device can provide custom firmware/microcode to the memory module. Accordingly, non-default interaction with raw memory (e.g., increasing/decreasing read/write times, employing non-default wear-leveling algorithms, employing non-default data interleaving algorithms, etc.) can occur. Further, the firmware/microcode can be selected based on a characteristic of the memory module. Thus, a degree of custom optimization can occur by matching firmware to characteristics of the memory module. Furthermore, in some aspects, multiple process modules can be provided to the dynamic download agent and stored at the memory module. An arbitration device can select a process module based on requirements of an application at the host device. Accordingly, interaction with raw memory can be customized depending on specifications of a remote application interacting with the memory.

It should be appreciated that, as described herein, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). The aforementioned carrier wave, in conjunction with transmission or reception hardware and/or software, can also provide control of a computer to implement the disclosed subject matter. Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the amended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the figures, FIG. 1 depicts a block diagram of an example system 100 that enables downloading of process modules for controlling non-volatile memory (112). System 100 can comprise a host electronic device 102 communicatively coupled with a memory controller 104 (e.g., comprising a memory control module). Such devices (102, 104) can be configured to exchange commands, data requests, and the like, as discussed below.

Memory controller 104 is coupled with raw non-volatile memory 112 to, in part, form a memory module (e.g., universal serial bus [USB] flash module). Host electronic device 102 can comprise a host processing component 106 that queries the non-volatile memory controller 104 and obtains at least one characteristic of the non-volatile memory (104, 112). Characteristics of the non-volatile memory (104, 112) can include any suitable function, feature, electronic interface, hardware, software, addressing structure, read/write/erase component, and so on. The characteristics can pertain to memory controller 104, raw non-volatile memory cells 112, an addressing structure or bus utilized by the controller to identify and/or communicate with the raw memory cells, or any other suitable component of a non-volatile memory module. According to some aspects, the characteristic can be pertinent to a class of memory (e.g., memory common to a manufacturer, a common memory model, etc.).

In other aspects, a memory module characteristic(s) can be pertinent to a particular memory controller 104 and/or a block or group of non-volatile memory cells 112. Class and device specific characteristics can include read/write times, erase times, management and/or control algorithms (e.g., wear-leveling algorithm, data interleaving algorithm, block addressing algorithm, read, write and/or erase algorithm, data transformation algorithms, and/or the like), etc. Device specific characteristics can include number of erase cycles implemented for various memory blocks, a particular maximum or minimum read/write/erase time of a memory module, location of bad blocks of cells, an amount (e.g., percentage) or type of data (e.g., identified by meta-data) stored in memory, or the like.

A query sent by the host processing device 106 can involve an electronic communication 'handshake' between the host electronic device 102 and the memory controller 104. Such a handshake can, in some instances, initiate device pairing. As an example, the handshake can comprise request, receipt and/or exchange of identification information at one or both of the devices (102, 104). For instance, the handshake can comprise a request by the host processing component 106 for identification information pertinent to the memory controller 104, non-volatile memory 112, or a memory module package that comprises the controller (104) and raw memory (112). If identification information provided from one device (102, 104) to the other device (102, 104) is verified (e.g., with reference to stored identification information) and a class of the verified device determined, instructions suitable for communicating with such device/class can be loaded and implemented for future data exchange. Once the handshake is complete, the request for the at least one characteristic can be implemented by host processing component 106.

If the handshake is successful (e.g., if suitable identification information is provided/received) host processing component 106 can provide a dynamic download agent to the memory controller 104. The dynamic download agent can couple to host processing device 102 to obtain one or more process modules (e.g., microcode, firmware, configuration files, etc.). According to at least one aspect of the subject disclosure, the one or more process modules can comprise at least one non-default algorithm. The non-default algorithm can be distinct from algorithms included with a factory-shipped memory device (104, 112) and/or firmware upgrade.

In addition to the foregoing, host processing device 102 can include a reference component 108 that identifies a memory control module suitable for memory controller 104 and/or non-volatile memory 112. Identification of the memory control module can be based at least in part on the at least one characteristic. Accordingly, a memory control module optimal for a management or control feature of the memory controller 104 or non-volatile memory 112 can be selected by the reference component 108.

In some aspects of the disclosure, the reference component 108 can select a process control module based on one or more control or management algorithms (e.g., factory-shipped algorithm, manufacturer algorithm, 3d party algorithm, non-default algorithm, custom-defined algorithm, etc.) associated with the process control module. In general, a control/management algorithm can pertain to any suitable function, control, or operation of memory controller 104 or raw non-volatile memory 112. Examples of suitable functions/controls/operations can include wear-leveling, data interleaving, data transformation, read, write and/or erase procedures, speeds, or implementation mechanisms (e.g., an index-based rollback mechanism, as discussed supra), or the like.

In one particular example, a process control module selected by reference component 108 can comprise one or more data transformation algorithms. Such algorithm(s) can manage data compression, data encryption/decryption, data filtering, aggregation, sorting, and/or like data transformation operations. Furthermore, in at least some aspects, such a process control module can be selected by the reference component 108 based on quantity and/or type of data stored at raw memory 112. For instance, a process control module comprising a relatively high compression algorithm can be selected based on an amount of data stored in raw memory (112) or, e.g., a percentage of available raw memory 112, or the like. As another specific example, a process control module comprising a particular encryption algorithm can be selected based on a type of data or sensitivity of data stored in raw memory (112). Type/sensitivity can include classified data, military data, personal data, etc., and can be identified by data classification/categorization mechanisms known in the art (e.g., data tag, description field, user-input, user authorization or security level, user title, system specification or architecture, and so on)

Host processing device 102 can further include an interface component 110 that downloads the identified/selected memory control module to memory controller 104. The downloaded memory control module can contain instructions for interfacing to raw memory. In some aspects, the downloaded control module can take advantage of a particular characteristic of the memory (104, 112) (e.g., a data addressing index). In other aspects, a non-default algorithm (e.g., a data transformation algorithm) of the identified/selected memory control module can enable the memory controller 104 to control or manage the raw non-volatile memory 112 in a non-default manner (e.g., non-default compression or encryption/decryption). For instance, the raw memory 112 can be wear-leveled according to a non-default wear-leveling algorithm. Further, the non-default wear-leveling algorithm can be selected for a particular characteristic of the memory (104, 112), as described herein. In another example, a quick data rollback can be implemented by delaying erase operations and employing a data addressing index to re-point to refreshed data (e.g., stored in a temporary block) or data scheduled for erasure.

In one particular example, the memory controller 104 can be configured to obtain data filtering, sorting and aggregation code to implement abstracted data management at the memory device (104, 112). Typically, data abstraction for non-volatile memory is performed by a host processing component 106 at a host device 102. This requires stored data to be transferred between a non-volatile memory module (104, 112) and a host device 102 and then processed at the host device (e.g., filtered, sorted, ordered into a file system or database, or the like). One problem is that typical bus speeds (e.g., USB) utilized to interface non-volatile memory chips (104, 112) with other devices (102) have not increased commensurately with the storage capacity of non-volatile memory 112. Accordingly, data filtering, aggregation, etc., can be relatively slow when compared with similar operations stored in RAM, disc/disk storage, or other storage local to the host device 102 (e.g., coupled to host processing component 106 on a fast bus).

In addition to the foregoing problem, many different formats for abstracted data exist, and such formats can change often based on manufacturer software/firmware updates. As one example, it is common for various databases to store tabular data in different formats. Accordingly, it can be very difficult, if not substantially impossible, to update firmware of a memory microcontroller often enough to keep up with format changes with different releases/versions of various database products.

Accordingly, it is beneficial to couple a download agent with the memory controller 104 that obtains non-default algorithms for filtering, sorting, aggregating, etc., data stored in non-volatile memory based on characteristics of the memory device (104, 112), data stored in memory 112, or an application running at the host device 102. For instance, data processing performed at the memory module (104, 112) can take advantage of relatively high bus speeds between the raw memory 112 and memory controller 104. By offloading processing to the memory controller 104 (e.g., compression, encryption, filtering, sorting, etc.), data processing can be done in parallel between the controller 104 and the host processing device 106. Furthermore, the relatively fast bus between the memory controller 104 and memory 112 can be utilized to transfer bulk data. Thus, the relatively slower bus between the host device 102 and memory module (104, 112) can be utilized to exchange processed data instead, greatly increasing overall system 100 performance.

One example of abstracted data is a database. In a database, data can be processed and presented in a tabular manner (e.g., a table composed of rows and columns stored in row major form) and data can be filtered based on comparison to specified criteria. Such comparison(s) can be performed on a particular column(s) of each row, row of each column, or the like. As a particular example to illustrate the foregoing, a database organizes data stored in memory 112 into rows based on an animal type and columns based on habits of animals. One typical database operation might be to select all data for rows where an animal=a hippo. Instead of having to return all data stored in memory 112 to the host processing component 106 to filter on the rows where animal=hippo, the download agent can provide memory controller 104 with a suitable algorithm consistent with the database that perform the filtering. Accordingly, only the filtered data need be returned to the host processing component 106. Substantial efficiency is gained in the forgoing example, first because processing can be done in parallel at multiple processors (104, 106), and second because the relatively slow bus between the host device 102 and the memory module (104, 112) carries only a fraction of data that would otherwise be required in the above example if a suitable processing algorithm could not be obtained by the memory controller 104.

In yet another example, data aggregation algorithms can be downloaded to the memory controller 104 and utilized in conjunction with database management/data abstraction. For instance, one common operation is to return a number of items that fit a specified criteria and/or to simply return the number itself. One such request in a human resource database for an enterprise might be to return a number of people in the enterprise legal department having less than 2 years experience. An algorithm for filtering the data could be provided to memory controller 104, as described above, to extract those individuals meeting the above criteria (people in legal department of the enterprise+fewer than 2 years experience). In addition, another algorithm could do the summation on the number of people. Accordingly, the request can return just a single number, rather than all data meeting the criteria, or worse, all data stored in memory 112, for local processing at the host device 102. Accordingly, system 100 can provide a substantial benefit in non-volatile data management and data processing, not only by implementing highly flexible data processing at a memory controller 104, but by taking advantage of the relatively high data interface between the controller 104 and raw memory 112 to do bulk data operations.

Some additional data processing examples with respect to non-volatile memory (112) can include e-mail processing (e.g., return messages within my inbox sorted by time of receipt), enterprise content management (e.g., return the number of claims forms submitted for a given insurance policy, between dates x and y, involving spinal injuries, and filed by claimants residing in Dallas, Tex.), and so on. It should be appreciated that the foregoing examples are to be construed as non-limiting to the overall disclosure. Rather, specific data processing applications known in the art or made known to one of skill in the art by way of the context provided herein are incorporated into the subject disclosure.

As depicted, host processing device 102 and memory controller 104 can be communicatively coupled by a wired interface such as a bus structure, universal serial bus (USB), coaxial line, Ethernet, etc. In some aspects, the devices (102, 104) can be coupled by a wireless communication interface including, e.g., a Bluetooth® interface or a near field communication (NFC) interface. The wireless communication interface can also include a radio frequency (RF) interface such as a licensed cellular interface (e.g., global system for mobile communication [GSM], universal mobile telecommunication system [UMTS], code division multiple access [CDMA], wideband CDMA [W-CDMA], or the like) or an un-licensed RF interface (e.g., a wireless local area network [WLAN] including 802.11'x', wireless local loop [WLL], and so on) or a microwave frequency [MF] (e.g., wireless interoperability for microwave access [WiMAX]), or other suitable frequency for wireless data exchange (e.g., optical). In still other aspects, the devices (102, 104) can be coupled by a combination of wired and wireless communication interfaces.

Figure 2:
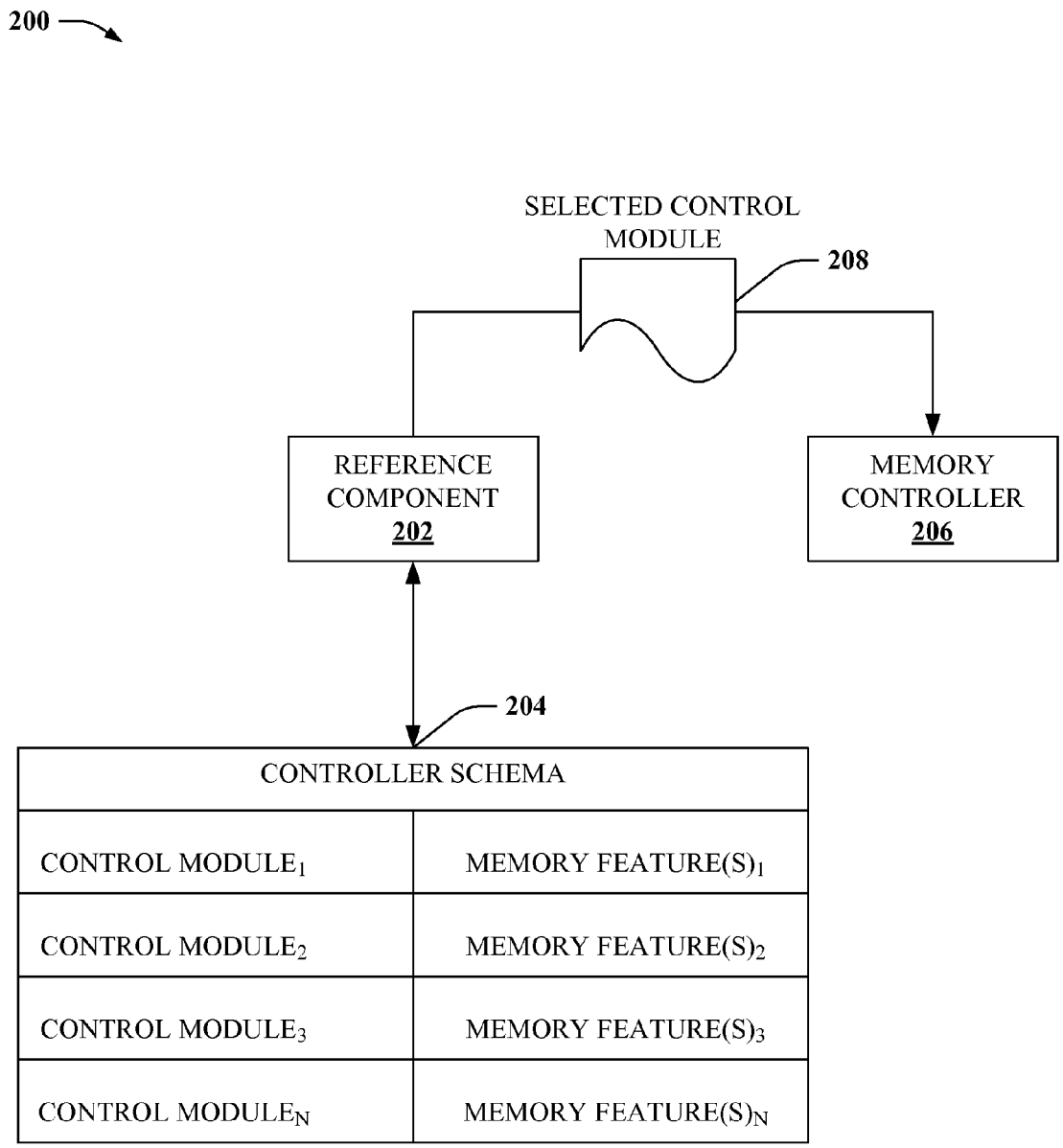
FIG. 2 depicts a block diagram of an example system that employs a controller schema to identify non-default microcode compatible with a memory module.

FIG. 2 depicts a block diagram of an example system 200 that employs a controller schema 204 to identify non-default microcode (208) compatible with a memory module (206). System 200 can comprise a reference component 202. The reference component 202 can be a part of a host processing device (not depicted) coupled with the memory module (206) (e.g., see FIG. 1 at 102, supra). Microcode (208) selected by reference component 202 can be provided to a memory controller 206 of a memory module. In some aspects, the microcode can be selected to implement non-default control and/or management of raw memory (206).

According to some aspects, reference component 202 can obtain one or more features and/or characteristics of the memory controller 206 and/or raw memory cells associated with the memory controller 206. Reference component 202 can cross-reference the feature(s)/characteristic(s) with a controller schema 204 that defines suitable control modules 1, 2, 3 . . . N (where N is a non-zero integer) correlated with features/characteristics 1, 2, 3 . . . N of memory. The controller schema 204 can correlate the control modules 1, 2, 3 . . . N with the memory features/characteristics 1, 2, 3 . . . N based on requirements of a host device application, memory performance metrics, maintenance limitations of the memory (206), or a combination thereof or of the like. For instance, a control module 1, 2, 3 . . . N employing a fast read/write algorithm can be correlated to a read/write feature of memory (206) that exceeds a certain threshold speed. Thus, if memory (206) can meet the threshold read/write speed, reference component 202 can select a control module 1, 2, 3 . . . N associated with that feature/characteristic 1, 2, 3 . . . N.

In another example, a control module 1, 2, 3 . . . N that can generate and/or reference a data index that maintains a location of refreshed data or data scheduled for erasure can be coupled with memory (206) that maintains such an index. Further, a control module 1, 2, 3 . . . N having instructions to delay erase/refresh scheduling can be coupled with a similar memory feature 1, 2, 3 . . . N. Such a memory module(s) 1, 2, 3 . . . N could implement an enhanced memory rollback as discussed herein.

Once a suitable control module 1, 2, 3 . . . N is selected by reference component 202 based on a received memory characteristic(s)/feature(s), the selected control module 208 is forwarded to the memory controller 206. Thus, memory controller 206 can employ one or more instruction sets, algorithms, etc., associated with the selected control module. What's more, the instruction sets, algorithms, etc., can be optimized for particular characteristics/features of the memory (206). According to some aspects, the instruction sets, algorithms, etc., can employ a non-default algorithm configured specifically to take advantage of one or more particular characteristics/features of the memory (206).

Figure 3:
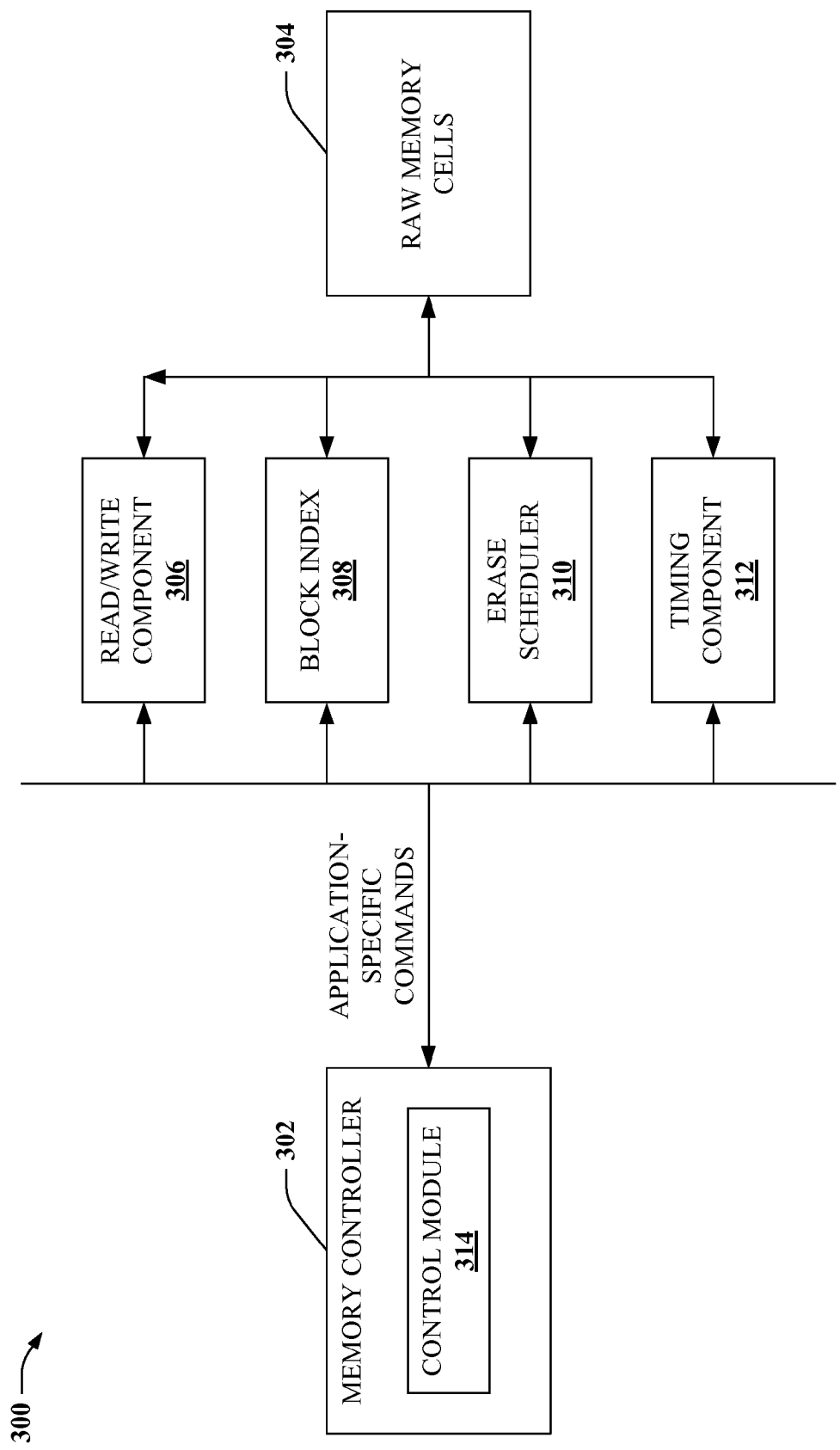
FIG. 3 depicts a block diagram of an example system that provides non-default control of raw memory cells according to aspects of the subject disclosure.

FIG. 3 depicts a block diagram of an example system 300 that provides non-default control of raw memory cells (304) according to aspects of the subject disclosure. System 300 comprises a memory controller 302 coupled to raw memory 304. The raw memory 304 can comprise any suitable non-volatile memory as described herein, including flash memory or the like. For instance, the raw memory cells 304 can be single cell flash memory (e.g., single bit), multi-cell flash memory (e.g., multi-bit), and so on.

System 300 can further comprise various components 306, 308, 310, 312 that enable the memory controller 302 to manage the raw memory cells 304. Examples of memory management include reading, writing and erasing the cells, indexing data and blocks of memory, wear-leveling, data interleaving, and so on. Further, memory controller 302 can comprise at least one control module 314 that contains instruction sets and/or algorithms utilized by memory controller 302 to instruct the components 306, 308, 310, 312 in conjunction with operating and/or managing the memory cells 304.

In some aspects, system 300 can comprise a read/write component 306 that can program cells and/or blocks of cells of the raw memory 304. Further, the read/write component 306 can employ a block index 308 to identify memory blocks that contain requested data, empty blocks that can be written to, temporary blocks utilized for storing data during a refresh, or the like. The read/write component 306 can obtain or write data to the raw memory cells 304 at various speeds, as directed by memory controller 302, and/or utilizing various read/write algorithms provided by control module 314. In some aspects, read/write component 306 can write data or retrieve data in a non-default manner (e.g., different from manufacturer provided defaults), such as at different speeds, or as directed by various non-default algorithms.

Block index 308 can maintain addressing information utilized to distinguish memory cells and/or blocks of such cells of the raw memory 304. By distinguishing the cells/blocks, reading, writing, erasing, wear-leveling, etc., of particular cells or blocks can be accomplished. Addressing can be performed by block index 308 in a non-default manner (e.g., correlating data and cell blocks in a manner substantially different than provided by factory-shipped addressing algorithms) according to one or more non-default algorithms maintained at control module 314. As one example, non-default addressing can provide improved rollback of erased data. For instance, where an erase or refresh cycle is implemented for a block of cells (e.g., by read/write component 306, block index 308 and erase scheduler 310), data within such cells can be copied into temporary cells for a certain duration. In one aspect, system 300 can employ a timing component 312 to adjust the duration in which data is stored in temporary cells. Thus, if rollback is required and data is still maintained in the temporary cells, block index 308 can address the data to the temporary cells to retrieve the data and accomplish the 'rollback'.

In another aspect, in conjunction with refreshing or erasing data, data from an original cell/block can be copied to a temporary cell(s)/block(s). Further, a non-default erase/refresh algorithm (314) can instruct erase scheduler 310 and/or timing component 312 to delay erase time for the original cell/block. If a rollback is requested prior to the delayed erase, erase scheduler 310 can cancel the erase and block index 308 can be instructed to re-address the data to the original cell/block. Thus, the rollback can be accomplished by pointing the data to the original cell/block and retrieving the data there from.

As described, system 300 provides for maintaining a process control module 314 at a memory controller 302. The process control module 314 can include non-default memory control/management algorithms. Further, the process control module 314 can be selected from a set of such control modules (314) based on characteristics, features and/or limitations, etc., of the raw memory cells 304, the memory controller 302, or operation components 306, 308, 310, 312 of a non-volatile memory system (300). Accordingly, in one aspect of the subject disclosure, the control/management of the raw memory cells 304 can be optimal for the characteristics of the memory system (300). In still other examples, a process control module 314 can be selected based on requirements of an application running on a host device (not depicted). In such case, control module 314 and memory controller 302 can contain instructions providing an abstracted interface for the host device. Such an interface can enable increased flexibility and simplification of interactions with the memory system 300.

Figure 4:
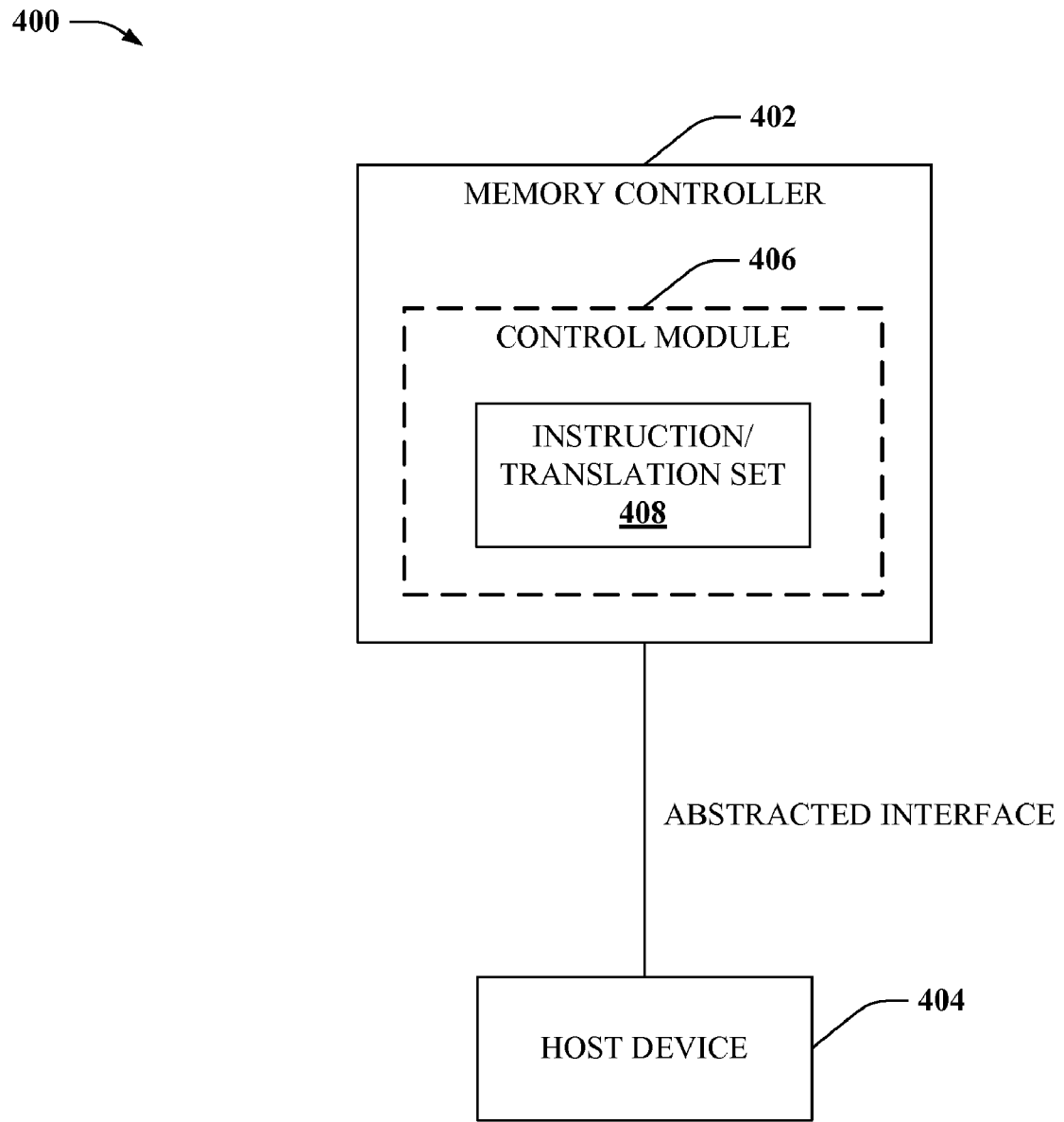
FIG. 4 illustrates a block diagram of an example system that provides an abstracted interface for non-volatile memory according to one or more aspects.

FIG. 4 illustrates a block diagram of an example system 400 that provides an abstracted interface for non-volatile memory (402) according to one or more aspects. System 400 comprises a memory controller 402 communicatively coupled with a host device 404 as described herein (e.g., see FIG. 1, supra). The memory controller 402 can comprise a control module 406, which includes a set of instruction and/or translation rules 408. Such rules 408 can be utilized, at least in part, to translate data and/or commands exchanged between the memory controller 402 and the host device 404 from a first format to a second format. By translating from the first format to the second format, control module 406 and the set of instruction/translation rules 408 can abstract an interface between the host device 404 and the memory controller 402.

As a particular example of the foregoing, the set of instruction/translation rules 408 can employ one or more translation schemas. The translation schemas can convert commands and/or data in a first format utilized by an application executing at host device 404, to a second format utilized to carry out the commands and/or read, write, erase, refresh, etc., the data at raw memory (not depicted). Thus, the host device 404 can communicate with the memory controller in a manner suited to the application, and the control module can interact with the raw memory in a manner suited to the control module 406 and memory.

According to still other aspects, a set of instructions/translation rules 408 can comprise at least one non-default algorithm provided or selected by host device 404 based on a characteristic of the memory controller 402 (and/or, e.g., of the control module 406 or of associated raw memory). Thus, according to at least some aspects of the subject disclosure, the non-default algorithm can be suited specifically to the characteristic of the memory controller 402 (or control module 406 or raw memory). Accordingly, host device 404 can interface with memory controller 402 in substantially a standard manner, but obtain the benefit associated with non-default algorithms utilized by set of instruction/translation rules 408 in controlling/managing raw memory.

Figure 5:
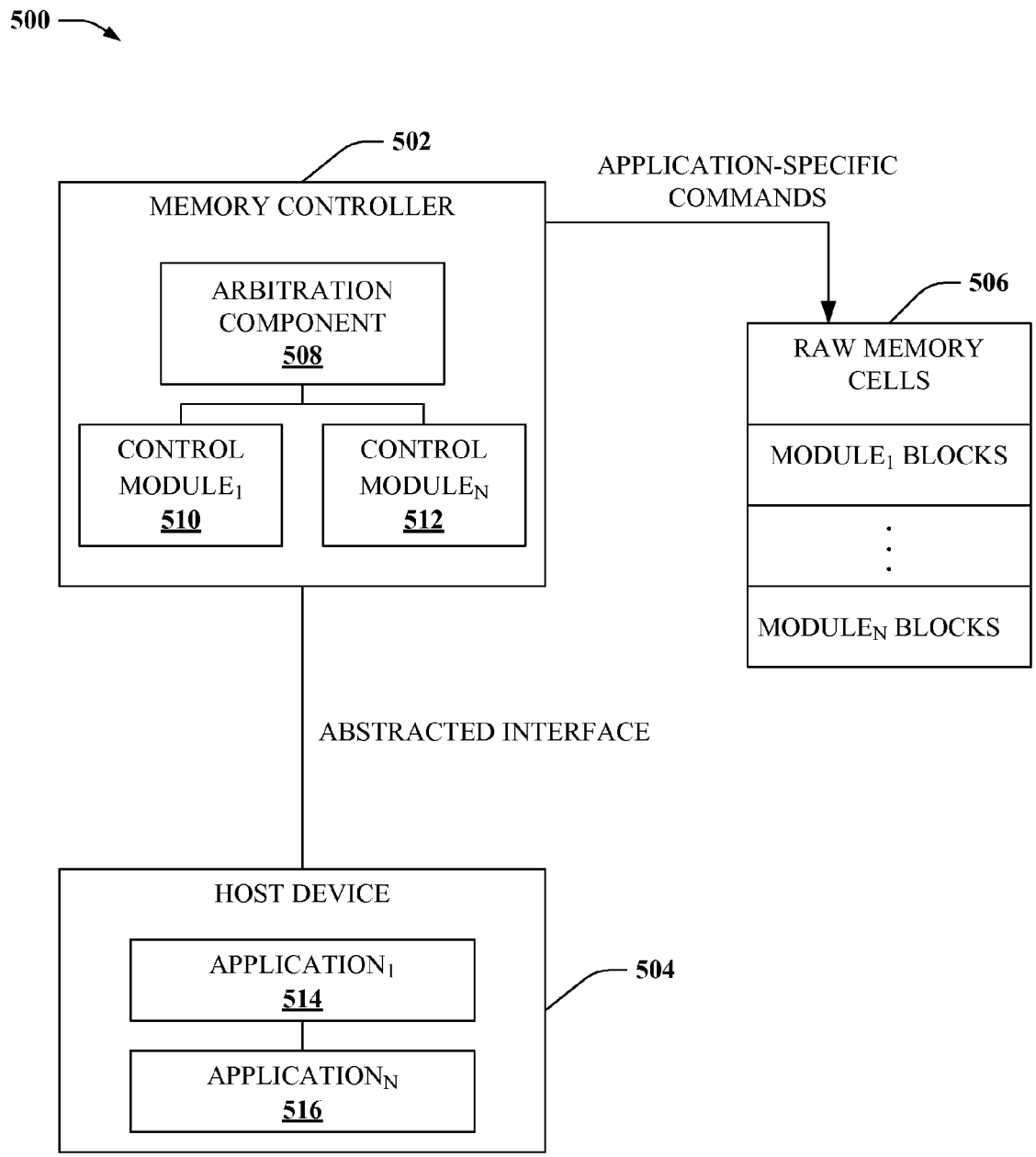
FIG. 5 depicts a block diagram of an example system that selects between non-default control algorithms for controlling raw memory of a memory module.

As a particular example, the host device 404 can update the control module 406 at the memory controller 402 (e.g., by providing an additional control module to a dynamic download agent or by requesting implementation of an alternate control module stored at memory controller 402, see FIG. 5, infra). Instead of having to alter commands, data requests and the like submitting to the memory controller 402 based on the updated control module (406), the instruction translation rules 408 can translate host device instructions/requests to a form pertinent to the updated control module (406). Accordingly, by employing an abstracted interface, updating the memory module 406 can be implemented in a flexible and smooth manner without substantial change to host device operation.

FIG. 5 depicts a block diagram of an example system 500 that can select between multiple control modules (510, 512) stored at a non-volatile memory module (502, 506). The control modules (510, 512) can provide sets of instructions for interfacing with raw memory 506. Furthermore, the control modules (510, 512) can be selected based on requirements of an application executing at a host device 504 coupled to the non-volatile memory module (502, 506). Accordingly, system 500 provides for a powerful and flexible interface to non-volatile memory (502, 506) that can be adapted to meet demands of various applications.

As depicted, system 500 comprises a memory controller 502 coupled with a host device 504. The host device 504 comprises one or more applications, application$_1$ 514 through application$_N$ 516, that can execute on the host device 504. Such applications 514, 516 can store data and/or consume data stored at one or more blocks of raw non-volatile memory 506 by way of an interface to memory controller 502.

Memory controller 502 comprises two or more control modules, control module$_1$ 510 through control module$_N$ 512 that provide instructions for interfacing to, managing and controlling the non-volatile raw memory cells 506. The control modules 510, 512 can facilitate providing the host device 504 with various interfaces to the raw memory 506. For instance, control module$_1$ 510 can comprise a first interface that employs a first read/write algorithm, whereas control module$_N$ 512 can comprise a second interface that employs a second read/write algorithm that is different from the first read/write algorithm.

In some aspects, the different interfaces to the raw memory 506 can provide various levels of abstraction between the host device 504 and the raw non-volatile memory cells 506. For instance, the control modules 510, 512 can employ various translation instructions that convert a set of commands from an application format to a memory control format. For instance, control module$_1$ 510 can employ a structured query language (SQL) translator to convert SQL queries submitted by an application 514, 516 to an addressing structure utilized by the raw memory cells 506. Further, the control module$_1$ 510 can employ searching instructions that enable the memory controller 502 to search data stored in the raw memory cells 506. Accordingly, control module$_1$ 510 can facilitate filtering data stored in raw memory in response to an SQL query. Ability to receive and respond to SQL queries is one example of an abstracted interface provided by system 500 between a host device 504 and memory controller 502. It should be appreciated that various other suitable abstracted interfaces, known in the art or made known to one of skill in the art by way of the examples provided herein, are incorporated into the subject disclosure.

In addition to the foregoing, the control modules 510, 512 can provide various levels of management and/or control over the raw memory cells 506. For instance, the control modules 510, 512 can adapt at least one transaction-level characteristic, feature, function, component, etc. of the non-volatile raw memory cells 506 for an application 514, 516 operating at the host device 504. Examples of transaction-level characteristics that can be adapted by various control modules 510, 512 employing various control algorithms can include program/write time, erase time, a wear-leveling algorithm, a data refresh algorithm, a data refresh rate, block-level location and addressing for identifying stored data, block-level location and addressing applied to data for a particular application 514, 516, a policy for erasing data, instruction sets utilized to communicate between the memory controller 502 and host device 504 (e.g., advanced technology attachment [ATA], parallel ATA [PATA], serial ATA [SATA], and so on), or a combination thereof or of the like. In at least one aspect of the subject disclosure, at least one of the control modules 510, 512 is optimized to manage a function of the raw memory 506 that is peculiar to non-volatile memory (e.g., wear-leveling).

To facilitate multiple control modules 510, 512 stored simultaneously, memory controller 502 can comprise an arbitration component 508. Arbitration component 508 can select between two or more control modules 510, 512 (e.g., firmware versions, separate micro-codes, instruction sets, configuration files, translation/abstraction sets, etc.) stored at and/or downloaded to the memory controller 502 (e.g., by way of a dynamic downloading agent, as discussed herein). In one aspect, arbitration component 508 can select between a first control module (510) and at least one other control module (512) based at least in part on an application 514, 516 associated with host device 504. For instance, various requirements/preferred settings of the applications 514, 516 can be implemented by various control modules 510, 512 (e.g., related to the transaction-level characteristics/features of the memory 502, 506). In order to provide an improved interface to the memory 506, arbitration component 508 can select between such control modules 510, 512 as suitable for a particular requirement/setting.

According to additional aspects, arbitration component 508 can allocate particular blocks of raw memory 506 to particular control modules 510, 512. In such aspects, potential data errors, resulting from different control modules applying different algorithms, translation instructions, data addressing schemas, etc., to the same blocks of memory can be mitigated or avoided. Where necessary, data can be copied from one block of raw memory (506) to another block so the data can be available to the memory controller 502 if arbitration component 508 switches from one control module (510, 512) to another (510, 512). In one aspect, a common block of data can be maintained that corresponds to a common set of instructions independent of various control modules (510, 512). Thus, shared data can be access according to the common set of instructions regardless of which control module (510, 512) is active.

As described, system 500 provides a great deal of power and flexibility for applications 514, 516 interacting with non-volatile memory 506. The ability to control and/or manage raw memory 506 based on characteristics of the applications 514, 516 and/or characteristic of the memory (502, 506) itself can provide increased reliability and productivity. Further, utilizing an abstracted interface between the controller 502 and host device 504 can facilitate reducing complexity in the host device 504 with respect employing non-default control and management of the memory (502, 506).

The aforementioned systems have been described with respect to interaction between several components. It should be appreciated that such systems and components can include those components or sub-components specified therein, some of the specified components or sub-components, and/or additional components. For example, a system could include host electronic device 102, memory controller 104, instruction/translation set 408, and abstraction component 508, or a different combination of these and other components. Sub-components could also be implemented as components communicatively coupled to other components rather than included within parent components. Additionally, it should be noted that one or more components could be combined into a single component providing aggregate functionality. For instance, host processing component 106 can include reference component 108, or vice versa, to facilitate querying for characteristics of non-volatile memory and cross-referencing such characteristics against a control schema by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 6:
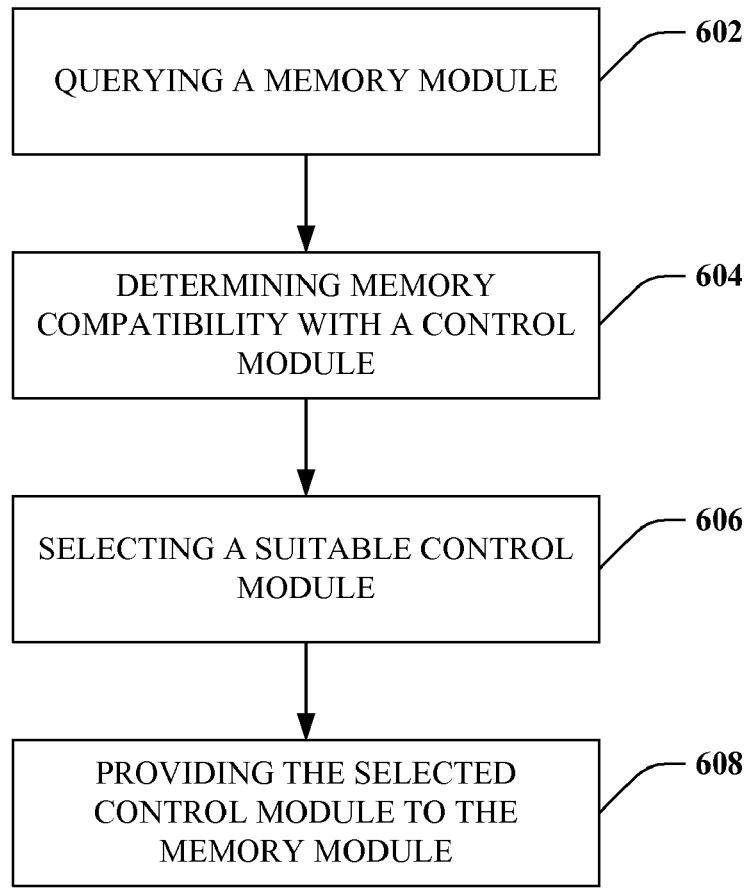
FIG. 6 illustrates a sample methodology for downloading non-default microcode to a non-volatile memory module according to aspects disclosed herein.
Figure 7:
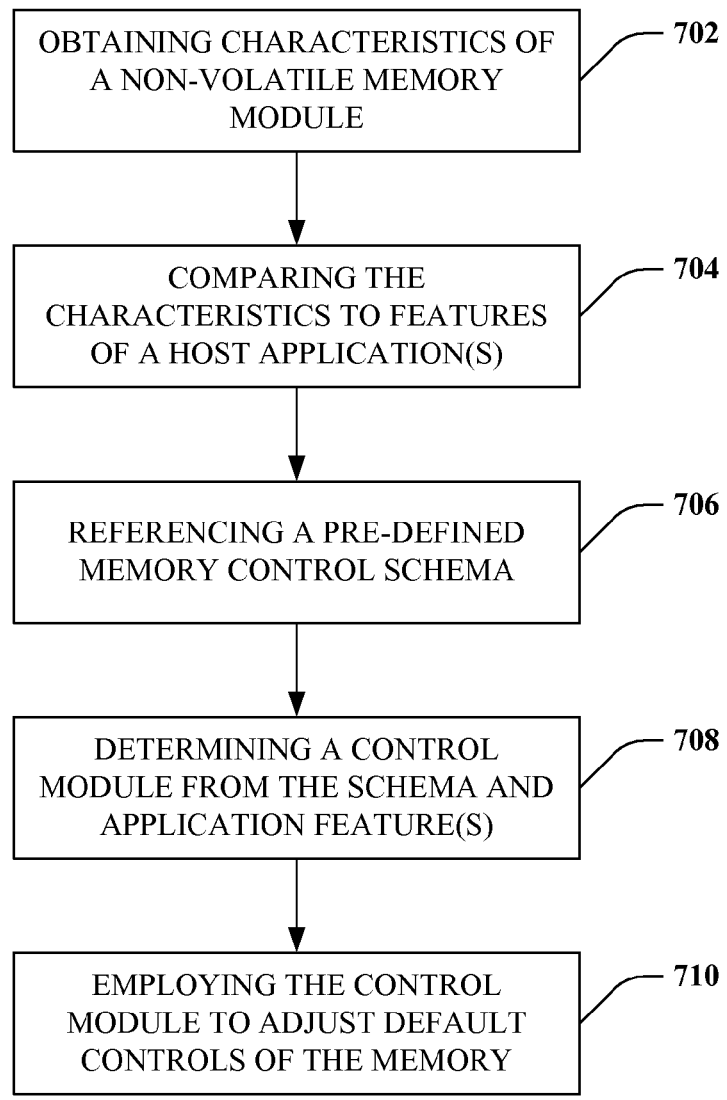
FIG. 7 depicts an example methodology for selecting from a set of microcode to provide custom control of raw memory.
Figure 8:
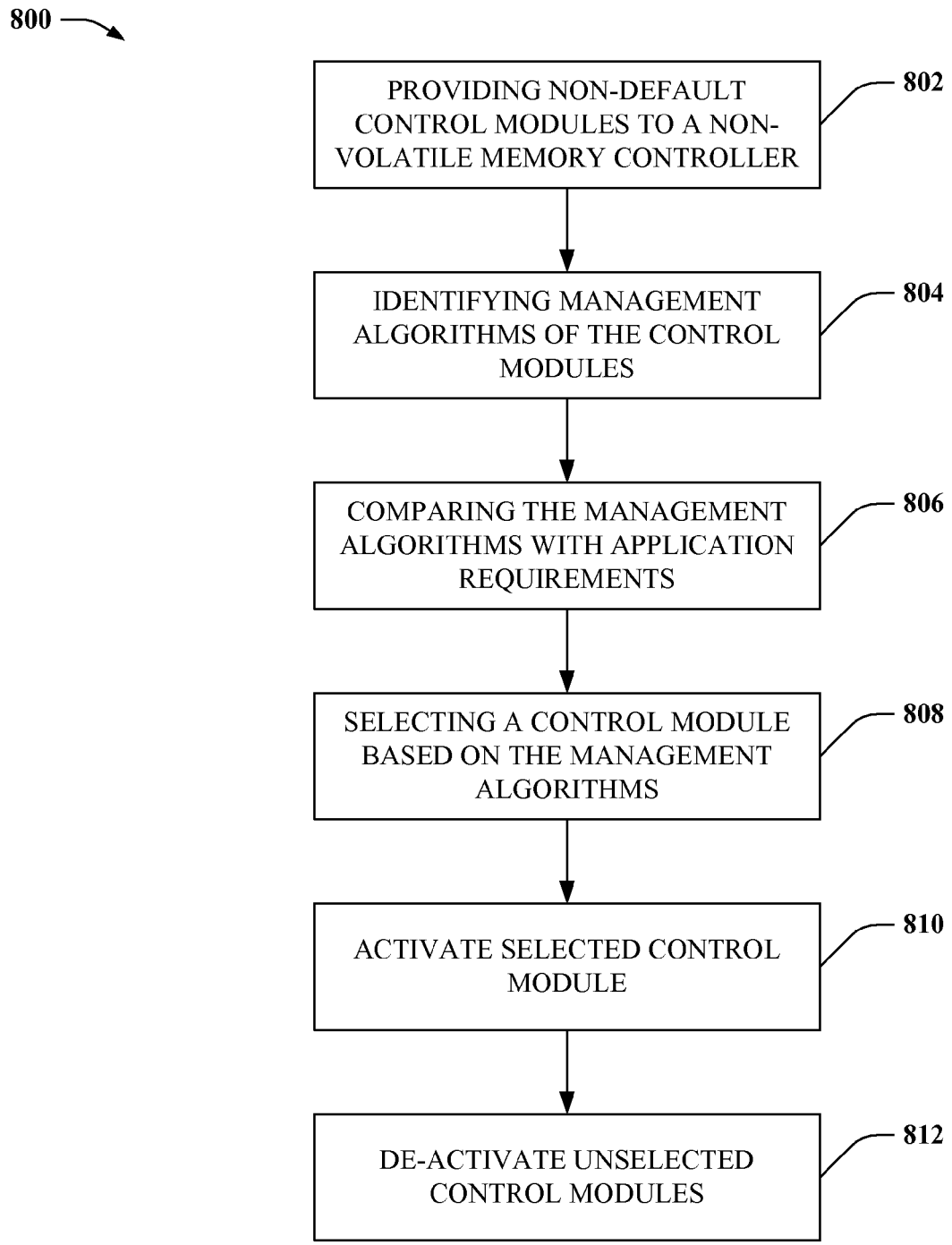
FIG. 8 illustrates an example methodology for providing control of raw memory in a non-default manner based on requirements of a host application.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or media.

FIG. 6 illustrates a sample methodology 600 for downloading non-default microcode to a non-volatile memory module according to aspects disclosed herein. At 602, method 600 can query a memory module. The memory module can include various electrically erasable non-volatile memory, such as single bit memory, multi-bit memory, flash memory, such as EAROM, EPROM, EEPROM, NOR gate flash memory, NAND gate flash memory, and so on. The query can be sent to a microcontroller associated with the memory module. Furthermore, a response to the query can be received from the microcontroller, wherein the response provides at least one characteristic, feature, function, limitation, etc., of the microcontroller, raw memory, addressing structure, or other suitable component of a particular memory module or a class of memory modules (e.g., common to a manufacturer module number).

At 604, method 600 can determine compatibility of the queried memory module with one or more control module. The compatibility can be based on information comprising the at least one characteristic, feature, function, and/or limitation, or the like. Specifically, the information can be compared with one or more instruction sets, translation sets (e.g., firmware, microcode, configuration files), etc., of the control module. As a particular example, a control schema can be referenced that correlates features/functions/characteristics/limitations of non-volatile memory with various control modules configured to interact with non-volatile memory. In some aspects, the control modules maintained by the control schema could each be configured to be suitable to at least one of the features/functions/characteristics/limitations. Accordingly, based on the information received in response to the query, a control module suited to the memory module can be determined.

At 606, method 600 can select a particular control module for the memory module. The selection can be based on aspects of the particular control module that are received in response to a query. In one aspect, the control module can be suited to at least one characteristic of the memory module. In anther aspect, the control module can be suited to a requirement or preferred specification of an application storing data on or consuming data from the memory module. According to still other aspect, the control module can comprise at least one non-default algorithm (e.g., non factory-shipped, or non-manufacturer provided, or the like) for controlling and/or managing raw memory of the memory module.

At 608, the selected control module can be provided to the memory module. For instance, a dynamic download agent can be transmitted to a microcontroller. The dynamic download agent can comprise, for instance, a self-executing application that can install on the memory module. Once installed, the dynamic download agent can interface to a host device and receive the selected control module. The control module can then be accessed by the microcontroller to control/manage raw memory operations according to instructions provided in the selected memory module (e.g., firmware instructions). Accordingly, method 600 provides a way to increase flexibility and scalability of non-volatile memory, by exploiting particular characteristics of the memory and updating microcode/firmware of a memory microcontroller suited to such characteristics.

FIG. 7 depicts an example methodology 700 for selecting from a set of microcode to provide custom control of raw memory. At 702, method 700 can obtain characteristics of a non-volatile memory module, as described herein. At 704, method 700 can compare the obtained characteristics to features of a host application(s). For instance, preferred or required specifications pertaining to transaction-level functions of non-volatile memory can be identified from the host application(s). Such functions can include, read/write/erase times, addressing structure, data index algorithms, wear-leveling algorithms, data interleaving algorithms, or other suitable functions of memory. As a particular example, if memory writing operations implemented by the host application(s) are time sensitive or sensitive to delay in processing, the application(s) can benefit form particular algorithms that limit maintenance functions of memory (e.g., wear-leveling). Accordingly, such an application(s) can be identified in conjunction with a particular maintenance algorithm.

At 706, method 700 can reference a pre-defined memory control schema. Such a schema can be utilized to correlate control modules (e.g., firmware, microcode, configuration files) suitable to one or more host application characteristics (read/write sensitivity). At 708, method 700 can determine a suitable control module from the control schema, based on the characteristics/features of the host application(s). At 710, method 700 can employ the control module to adjust default controls of the memory (e.g., change read/write times, employ a non-default wear-leveling algorithm, and so on). As described, method 700 provides enhanced flexibility in managing memory by selecting one or more control modules pertinent to particular characteristics of applications interacting with the memory.

FIG. 8 illustrates an example methodology 800 for providing control of raw memory in a non-default manner based on requirements of a host application. At 802, method 800 can provide non-default control modules to a microcontroller associated with a non-volatile memory module. The non-default control modules can be selected by a host device to interact with raw memory in a manner suited toward one or more applications of the host device. Non-default control modules can include one or more algorithms that depart from manufacturer-specified algorithms, factory-shipped algorithms, and so on.

At 804, method 800 can identify one or more management algorithms of the non-default control modules. The management algorithms can relate to means for controlling raw non-volatile memory cells, means for abstracting an interface between a memory controller and a host device, or a combination thereof or of the like. At 806, the identified management algorithms can be compared with requirements/specifications of one or more host applications. In one aspect, features/characteristics of the host applications can be compared with corresponding features/characteristics of the management algorithms. In particular, instructions of the applications can be compared with instructions of the management algorithms. A need for any abstraction to translate application instructions to management instructions can be identified.

At 808, method 800 can select a control module based at least in part on characteristics of the management algorithm(s) and the requirements/specifications of the one or more host applications. Thus, for example, method 800 could employ an arbitration mechanism to activate a selected control module and de-activate one or more non-selected control modules, at 810 and 812. Thus, a microcontroller associated with the memory could then interact with the raw memory as specified by the selected control module. As described, method 800 provides for enabling multiple control modules to be maintained at a memory device, where implementation of one of the memory modules can be based at least in part on characteristics of the memory, characteristics of a host application, and/or need for instruction translation and/or an arbitrated interface between memory and a host device.

Figure 9:
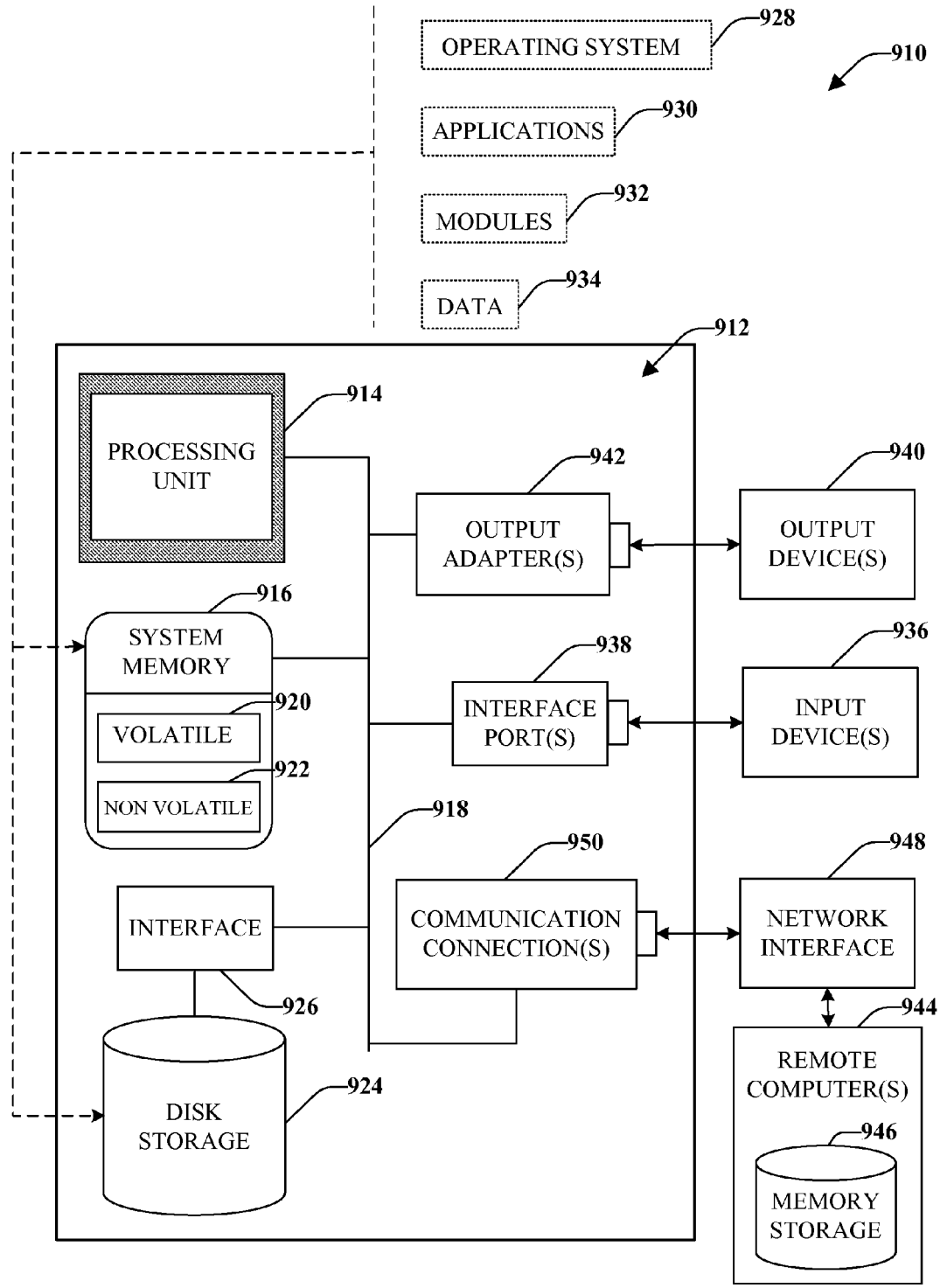
FIG. 9 depicts a block diagram of an example operating system for downloading and executing non-default microcode at a non-volatile memory module.
Figure 10:
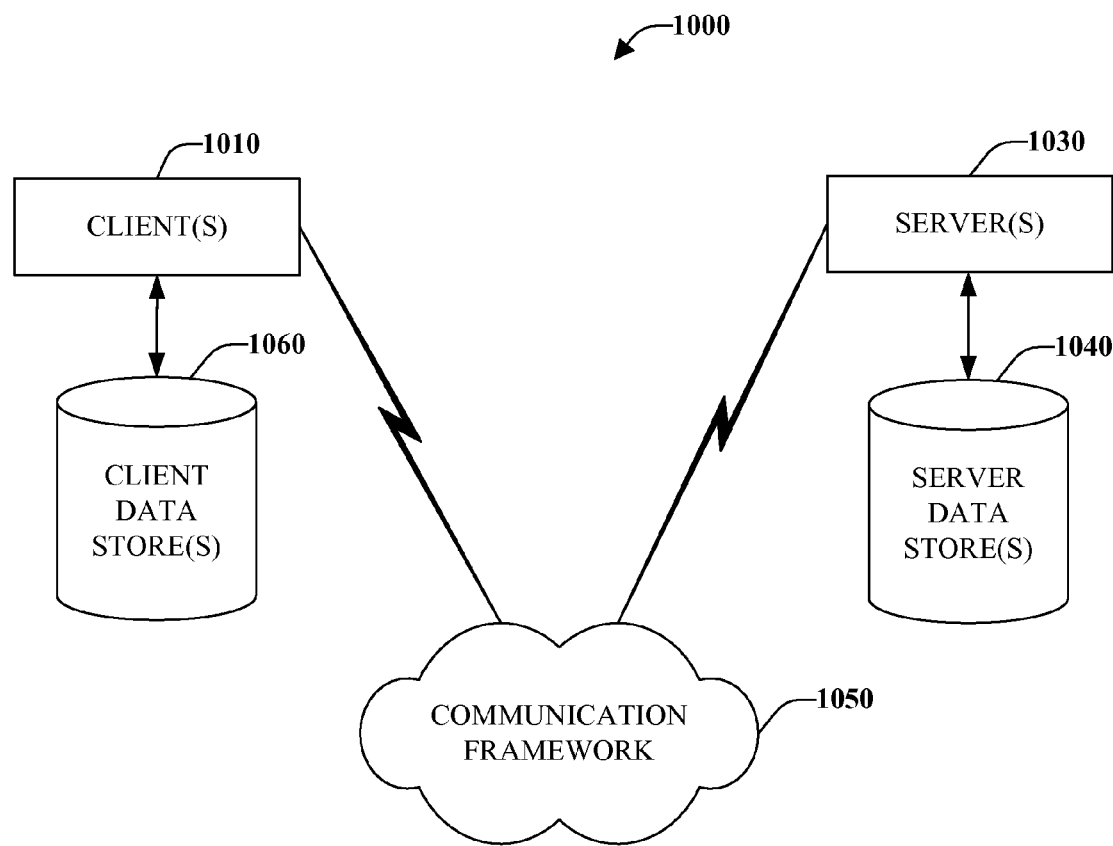
FIG. 10 illustrates a block diagram of an example system for providing remote instructions to memory for downloading microcode or controlling raw memory.

In order to provide additional context for various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules.

Generally, program modules include routines, programs, components, data structures, etc. that can perform particular tasks and/or implement particular abstract data types. Such tasks can include storing or retrieving memory, executing applications that store or consume stored memory, implementing data storage schemas, controlling and managing raw non-volatile memory, and so on, as described herein. Further, relevant tasks can include obtaining characteristics of a memory module, referencing a control schema to determine a control module suited to such characteristics, and providing the control module to the memory module utilizing a dynamic download agent, as described herein. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices, described below.

With reference to FIG. 9, an exemplary environment 910 for implementing various aspects disclosed herein includes a computer 912 (e.g., desktop, laptop, server, hand held, programmable consumer or industrial electronics . . . ). The computer 912 includes a processing unit 914, a system memory 916, and a system bus 918. The system bus 918 can couple system components including, but not limited to, the system memory 916 to the processing unit 914. The processing unit 914 can be any of various microprocessors, such as dual microprocessors, quad microprocessors, and other multiprocessor architectures suitable for a computer environment 910.

The system bus 918 can be any of several types of suitable bus structure(s) including the memory bus or memory controller, a peripheral bus or external bus, and/or a local bus using any suitable variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922 (including electrically addressable non-volatile memory, referred to as non-volatile memory above). The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example, disk storage 924. Disk storage 924 includes, but is not limited to, devices such as a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in operating environment 910. The software can include various rules for implementing aspects of the subject disclosure, such as determining preferred memory read/write times for implementing application dynamics, determining a suitable memory process module for preferred/required aspects of one or more applications, selecting between various modules based on current application requirements, and so on as described herein. Such software can include an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user can enter commands or information into the computer 912 through input device(s) 936. Input devices 936 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 can utilize some of the same type of ports as input device(s) 936. Thus, for example, a USB port may be used to provide input to computer 912 and to output information from computer 912 to an output device 940. Output adapter 942 is provided to illustrate that there are some output devices 940 like displays (e.g., flat panel and CRT), speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and can typically include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems, power modems and DSL modems, ISDN adapters, and Ethernet cards or components.

FIG. 10 is a schematic block diagram of a sample-computing environment 1000 with which the present invention can interact. For instance, the environment 1000 can be suitable to provide a remote interface between one or more host devices and/or applications and a memory module, memory controller and/or control module, as described herein. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system, comprising:
    a host processing device including a processor configured with executable instructions to query non-volatile memory and obtain information pertaining to at least one characteristic of the non-volatile memory;
    a reference component that cross-references the at least one characteristic with a controller schema and selects a memory control module suitable for a memory processing component of the non-volatile memory based at least on the at least one characteristic, the controller schema correlating a plurality of different memory control modules with a plurality of memory characteristics, the different memory control modules each being configured to implement instructions that manage memory operations for the non-volatile memory; and
    an interface component that downloads the selected memory control module to a memory controller associated with the non-volatile memory, wherein the selected memory control module provides the host processing device with a different interface to the non-volatile memory than a default interface, the different interface providing a different level of abstraction between the host processing device and the non-volatile memory than the default interface.

2. The system of claim 1, wherein the selected memory control module employs an algorithm for managing the non-volatile memory that is different from at least one default algorithm.

3. The system of claim 1, wherein the selected memory control module is selected based at least in part on an application operating on a host computer.

4. The system of claim 1, wherein the selected memory control module adapts at least one transaction-level characteristic of the non-volatile memory for an application operating on a host computer.

5. The system of claim 4, wherein the at least one transaction-level characteristic comprises at least one of:
    a program time;
    an erase time;
    a wear-leveling algorithm;
    a data compression algorithm;
    an encryption algorithm;
    an amount of data stored in raw memory;
    a type of a subset of the data stored in raw memory;
    a data refresh rate;
    a block-level location in which a type of data is stored;
    a block-level location in which data associated with the application is stored;
    a policy for erasing data; or
    an instruction set utilized to communicate between the host processing device and the memory processing component.

6. The system of claim 1, wherein the selected memory control module comprises at least one of:
    an algorithm enabling the memory controller to encrypt or decrypt data as the data is written to or read from the non-volatile memory;
    an algorithm enabling the memory controller to compress or decompress data as the data is written to or read from the non-volatile memory; or
    an algorithm enabling the memory controller to filter, sort, or aggregate data stored in the non-volatile memory.

7. The system of claim 1, further comprising an arbitration component that selects between the memory control module and at least one additional memory control module downloaded to the memory controller.

8. The system of claim 7, wherein the arbitration component selects between the memory control module and the at least one additional memory control module based at least in part on an application associated with the host processing device.

9. The system of claim 7, wherein the arbitration component allocates a segment of the non-volatile memory to the memory control module and a different segment of the non-volatile memory to the additional memory control module.

10. A method of interfacing a host device with non-volatile memory, comprising:
    querying a non-volatile memory;
    receiving information pertaining to at least one characteristic of the non-volatile memory responsive to the querying;
    employing a controller schema to determine compatibility of the non-volatile memory with a set of different onboard memory control modules based in part on the at least one characteristic, the different onboard memory control modules each being configured to implement instructions that manage raw cell blocks of the non-volatile memory;
    selecting at least one onboard memory control module based on a correlation between the at least one characteristic of the non-volatile memory and the at least one onboard memory control module; and
    providing the selected at least one onboard memory control module to the non-volatile memory, wherein the at least one onboard memory control module selected provides the host device with a different interface to the non-volatile memory than a default interface, the different interface providing a different level of abstraction between the host device and the non-volatile memory than the default interface.

11. The method of claim 10, further comprising selecting the at least one onboard memory control module based on an application executing on the host device.

12. The method of claim 10, further comprising employing, for the query, an inter-device handshake or pre-defined schema that correlates characteristics of the non-volatile memory with one or more of the set of different onboard memory control modules.

13. The method of claim 10, further comprising providing at least one additional onboard memory control module to the non-volatile memory based on the at least one characteristic or at least one additional characteristic of the non-volatile memory.

14. The method of claim 13, further comprising selecting between the at least one onboard memory control module or the at least one additional onboard memory control module in conjunction with providing data to or retrieving data from the non-volatile memory.

15. The method of claim 14, further comprising employing a feature of an application executing on the host device as a criteria for the selecting between the at least one onboard memory control module and the at least one additional onboard memory control module.

16. The method of claim 10, further comprising selecting the at least one onboard memory control module based on at least one of:
   a data encryption algorithm that enables a memory controller to encrypt or decrypt data stored at the non-volatile memory;
   a compression algorithm that enables a memory controller to compress or decompress data stored at the non-volatile memory; or
   a data management algorithm that enables a memory controller to filter, aggregate or sort data stored at the non-volatile memory.

17. A system comprising:
   a host processing device including a processor configured with executable instructions to obtain data from a non-volatile memory, the data indicating a transaction level characteristic of the non-volatile memory;
   a reference component that cross-references the transaction level characteristic with a controller schema and selects a memory control module suitable for the non-volatile memory, the controller schema correlating a plurality of different memory control modules with a plurality of memory transaction level characteristics, the different memory control modules each being configured to implement an abstract interface that manages memory operations and data stored at the non-volatile memory;
   an interface component that downloads selected memory control modules to the non-volatile memory; and
   an arbitration component that selects between a first memory control module and a second memory control module based at least on a characteristic of an application executing at the host processing device and the transaction level characteristic of the non-volatile memory, the first memory control module or the second memory control module providing a non-default level of abstraction.

18. The system of claim 1, wherein the different level of abstraction provides non-default algorithms for filtering, sorting, and aggregating data stored at the non-volatile memory.

19. The method of claim 10, wherein the different level of abstraction provides non-default algorithms for filtering, sorting, and aggregating data stored at the non-volatile memory.

20. The system of claim 17, wherein the non-default level of abstraction provides algorithms for filtering, sorting, and aggregating stored data in the non-volatile memory.

* * * * *